United States Patent
Perrone et al.

(10) Patent No.: US 11,618,526 B2
(45) Date of Patent: Apr. 4, 2023

(54) BICYCLE BRAKE LEVER CAP

(71) Applicants: Michael Perrone, Lighthouse Point, FL (US); Julia Zolotova, Lighthouse Point, FL (US)

(72) Inventors: Michael Perrone, Lighthouse Point, FL (US); Julia Zolotova, Lighthouse Point, FL (US)

(*) Notice: Subject to any disclaimer, the term of this patent is extended or adjusted under 35 U.S.C. 154(b) by 0 days.

(21) Appl. No.: 17/589,356

(22) Filed: Jan. 31, 2022

(65) Prior Publication Data
US 2022/0242517 A1 Aug. 4, 2022

Related U.S. Application Data

(60) Provisional application No. 63/143,134, filed on Jan. 29, 2021.

(51) Int. Cl.
*B62K 23/06* (2006.01)
*B62M 25/04* (2006.01)
*B62L 3/02* (2006.01)

(52) U.S. Cl.
CPC ............. *B62K 23/06* (2013.01); *B62L 3/02* (2013.01); *B62M 25/04* (2013.01)

(58) Field of Classification Search
None
See application file for complete search history.

(56) References Cited

U.S. PATENT DOCUMENTS

| | | | |
|---|---|---|---|
| 3,803,941 A * | 4/1974 | Yoshikawa | B62L 3/02 74/543 |
| 5,392,669 A * | 2/1995 | Li | B62K 21/125 74/551.8 |
| 5,713,614 A | 2/1998 | Anderson | |
| 5,775,168 A * | 7/1998 | Furuta | B62M 25/04 74/489 |
| D719,808 S | 12/2014 | Musser | |
| 8,950,288 B2 | 2/2015 | Arnold | |
| D807,148 S | 1/2018 | Robinson et al. | |
| 10,766,131 B2 | 9/2020 | Deiser et al. | |
| 2003/0177609 A1 | 9/2003 | Bigolin | |
| 2012/0234130 A1 | 9/2012 | Yu | |

(Continued)

FOREIGN PATENT DOCUMENTS

| | | |
|---|---|---|
| EP | 2423088 | 2/2012 |
| KR | 100836579 | 6/2008 |
| KR | 20100046442 | 5/2010 |

OTHER PUBLICATIONS

Amazon, "Cane Creek 144.7 Hoods Non-Aero Black", https://www.amazon.com/Cane-Creek-144-7-Hoods-Non-Aero/dp/B000C17OEW/ref=sr_1_1?dchild=1&keywords=cane+creek+brake+hoods&qid=1599540490&sr=8-1, downloaded on Sep. 10, 2020, p. 1.

(Continued)

*Primary Examiner* — Vicky A Johnson
(74) *Attorney, Agent, or Firm* — The Concept Law Group, PA; Scott D. Smiley; Scott M. Garrett

(57) ABSTRACT

A brake lever end cap includes an elongated leg portion in which at least a portion of the brake lever is seated, and a foot portion joined to the leg portion and an end of the leg portion. The leg portion is joined to the foot portion such that the end of the leg portion joined to the foot portion is off center relative to the foot portion, and nearer the rear of the foot portion such that the majority of the foot portion extends forward of the leg portion.

16 Claims, 8 Drawing Sheets

(56) References Cited

U.S. PATENT DOCUMENTS

| | | | |
|---|---|---|---|
| 2013/0241173 A1* | 9/2013 | Talavasek | B62L 3/02 |
| | | | 280/281.1 |
| 2015/0225037 A1 | 8/2015 | Mildenberger | |
| 2017/0175391 A1* | 6/2017 | Hunt | E04G 21/3252 |
| 2017/0196572 A1 | 7/2017 | Robinson et al. | |
| 2017/0314270 A1* | 11/2017 | Zorio, III | E04C 5/161 |
| 2017/0349234 A1 | 12/2017 | Sala | |

OTHER PUBLICATIONS

Amazon, Mantain Bicycle Brake Levers Sleeve Silicone Gel Anti-Slip Brake Handle Protection Cover 1 Pair:, https://www.amazon.com/Mantain-Bicycle-Silicone-Anti-Slip-Protection/dp/B07QSTXXDS/ref=sr_1_6?dchild=1&keywords=bicycle+handle+grip+brake&qid=1599597102&sr=8-6, downloaded on Sep. 10, 2020, p. 1.

Wish, "2 Pcs/Lot Baby Children Kids Safety Supplies Room Doorknob Pad Cases Spiral Anti-Collision Security Door Handle Protect Cover", https://www.wish.com/product/2pcs-lot-baby-children-kids-safety-supplies-room-doorknob-pad-cases-spiral-anti-collision-security-door-handle-protect-cover-5a0655fbfb04de2dabcf28fb?hide_login_modal=true&share=web, downloaded on Sep. 10, 2020, p. 1.

\* cited by examiner

BICYCLE BRAKE LEVER CAP

CROSS REFERENCE

This application claims priority to U.S. provisional application No. 63/143,134, which was filed Jan. 29, 2021, the entirety of which is hereby incorporated by reference.

FIELD OF THE INVENTION

The present invention relates generally to end caps to prevent impalement, and, more particularly, relates to a structure for a bicycle lever end cap that eliminates the potential for impalement and which provides a comfortable and useful mechanical advantage for operating the brake level.

BACKGROUND OF THE INVENTION

It is common for bicycles and other velocipedes to have caliper or "pinch" type brakes for the front and rear wheels. They are operated by a cable that, when tension is applied to the cable, the brake calipers are urged toward each other to squeeze against the wheel rim, creating friction, which resists the turning of the wheel and thereby slows the bicycle. The cable is tensioned using a lever at the handlebar end that pivots about a fulcrum. The lever provides a mechanical advantage about the fulcrum to allow a person to exert sufficient force to stop the wheel(s).

Brake levers, especially on inexpensive bicycles, tend to have a relatively pointed end. In a fall or accident, the pointed end of a brake lever represents a potential risk of impalement. As such it is desirable to cover the end of the lever. Impalement risk is commonly mitigated by placing a cap with an enlarged surface to cover the pointed or relatively pointed end, providing a larger cross sectional area that resists impalement. For example, on construction sites, it is common, even required in some places, to cover the end of exposed rebar member with a cap that has a regular shape (circular or square) that is centered on the axis of the rebar member. However, because a brake lever is pulled toward the handlebar, having a cap that extends generally perpendicularly to an axis of the brake lever would create an interference between the handlebar and the cap, preventing a user from being able to sufficiently close pull on the lever to actuate the brake. One solution to this is the provide an extension on the end of the handlebar that extends forward from the end of the handlebar, to an extent so as to cover the end of the lever. However this approach still leaves the end of the brake lever exposed, and if the handlebar extension is misaligned, or if the brake lever assembly rotates about the handlebar, as can happen in a fall/crash, then the brake lever can still present a risk of impalement.

FIG. 1 shows an overhead view of the left end 100 of a bicycle handlebar 102 in accordance with the prior art. As is well known, it is common to provide a handle grip 104 over the end of the handlebar 102. The handlebar 102 can be made of a steel tube, or similar rigid material, and the handle grip 104 is typically made of rubber, and has an external texture to enhance grip. A brake lever 106 is mounted to the handlebar 102 on a support bracket 108. This is a common and well-known arrangement. The support bracket 108 includes a pivot 110 about which the brake handle 104 can pivot, such as by pulling the brake handle 106 toward the handlebar 102 and grip 104, as indicated by arrow 118. When the brake lever 106 is pulled toward the grip 104, the distal end 114 of the brake lever 106 will move toward the handlebar 102, in the direction of arrow 118, and a brake cable 112 will be pulled in a direction toward the end of the handlebar and tensioned, as indicated by arrow 116. The brake cable 112 has an anchor 120 that is mounted in a slot in the brake lever 106 at the proximal end 110 of the brake lever 106. The distal end 114 of the brake lever 106 is normally spaced about one to several inches from the handlebar 102 to allow sufficient distance to pull on the brake lever 106 and impart enough force to close the brake mechanism (not shown) and slow the bicycle. As a result, the distal end 114 is exposed. In the event the bicycle falls on a person, the distal end 114, having a relatively small cross sectional area, represents an injury risk to a person who may be impacted by the distal end 114 of the brake lever 104.

Therefore, a need exists to overcome the problems with the prior art as discussed above.

SUMMARY OF THE DISCLOSURE

In accordance with some embodiments of the inventive disclosure, there is provided a brake lever end cap for a bicycle brake lever that includes a rigid structure having an elongated leg portion having a channel formed along a length of the elongated leg portion. The channel is open at a free end of the elongated leg portion and is configured to receive at least a distal end of the brake lever therein. The rigid structure also includes a foot portion formed at an end of the elongated leg portion that is opposite the free end. The elongated leg portion is joined to the foot portion off-center such that a majority of the foot portion extends forward of the elongated leg portion. The end cap also includes an outer cover formed over the rigid structure. The outer cover is formed of a resilient material and has an opening at the free end of the elongated leg portion.

In accordance with a further feature, the outer covering partially obstructs the opening of the bore or channel in the rigid structure to provide a frictional engagement with the brake lever.

In accordance with a further feature, the outer covering extends from the free end of the rigid structure and is tapered from the free end of the rigid structure to reduce in cross sectional area.

In accordance with a further feature, the foot portion is circular.

In accordance with a further feature, the outer covering includes finger ridges.

In accordance with a further feature, the channel has a channel opening at a back of the leg portion along the leg portion, the channel has a width, the outer covering forms an opening along the channel opening that is narrower than the channel.

In accordance with some embodiments of the inventive disclosure, there is provided an end cap for a bicycle brake lever that includes an elongated leg portion having a free end and a channel that runs from the free end along the elongated leg portion inside the elongated leg portion. The channel is configured to receive a bicycle brake lever therein. The end cap further includes a foot portion joined to the elongated leg portion at an end of the elongated leg portion that is opposite the free end of the elongated leg portion. The foot portion is at a generally right angle to an elongated direction of the elongated leg portion, and the elongated leg portion is joined to the foot portion off center relative to the foot portion such that a majority of the foot portion extends forward of the elongated leg portion. The end cap further includes a rigid structure disposed in the foot portion. The foot portion and the elongated leg portion are made of a resilient material.

In accordance with a further feature, the end cap further incudes a rigid structure disposed in the channel of the elongated leg portion and that is joined to the rigid structure in the foot portion, wherein the rigid structure in the elongated leg portion incudes an elongated channel along the channel of the elongated leg portion.

In accordance with a further feature, the elongated leg portion further includes a tapered section at the free end, wherein the rigid structure in the elongated leg portion does not extend into the tapered portion, and wherein the channel through the tapered portion is narrower than the channel though the rigid member in the elongated leg portion.

In accordance with a further feature, the elongated leg portion includes finger ridges.

In accordance with a further feature, the entire elongated leg portion is tapered, increasing in width from the free end to the foot portion.

In accordance with a further feature, the channel in the elongated leg portion has a channel opening at a back of the leg portion along the leg portion, the channel has a width, the outer covering forms an opening along the channel opening that is narrower than the channel.

In accordance with a further feature, the foot portion is circular in a plane normal to the elongated direction of the elongated leg portion.

In accordance with a further feature, the elongated leg portion has a non-circular cross section in a direction normal to the elongated direction of the elongated leg portion.

In accordance with a further feature, the non-circular cross section is oval-shaped.

In accordance with a further feature, the non-circular cross section is rectangular.

Although the invention is illustrated and described herein as embodied in a bicycle brake lever end cap, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the structure being referenced. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
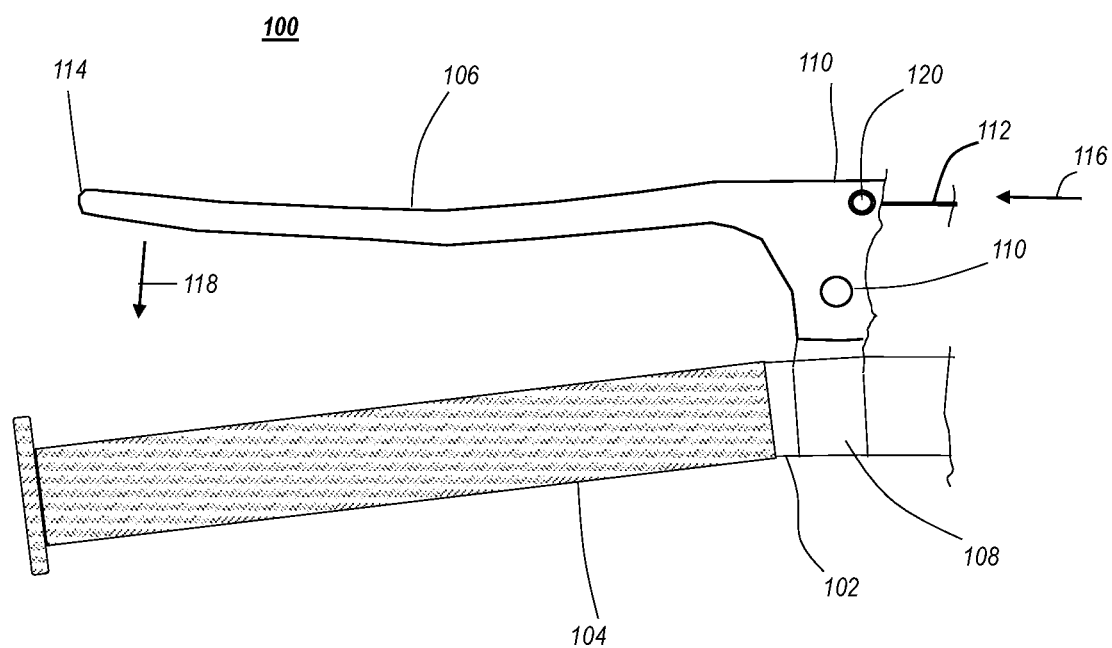
FIG. 1 show an overhead view of a left bicycle handlebar end including a grip and a brake lever, in accordance with the prior art.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2A:
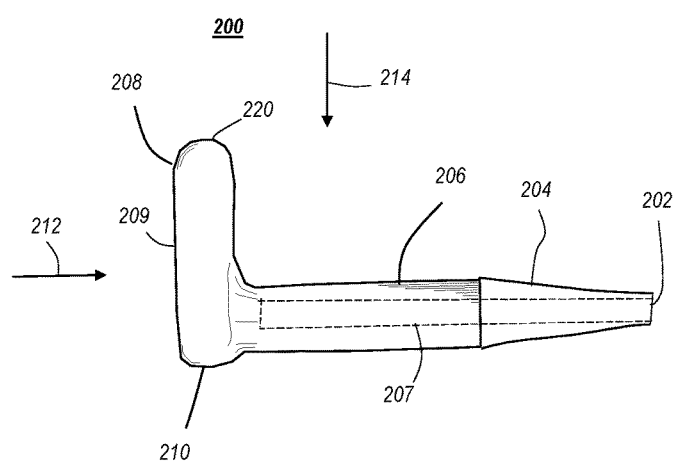
FIGS. 2A-2D show several views of a brake lever end cap, in accordance with some embodiments.
Figure 2B:
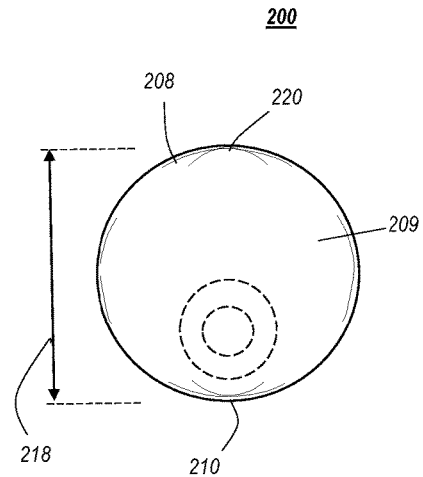
Figure 2C:
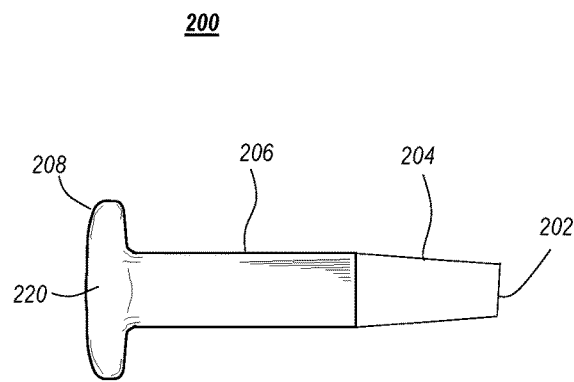
Figure 2D:
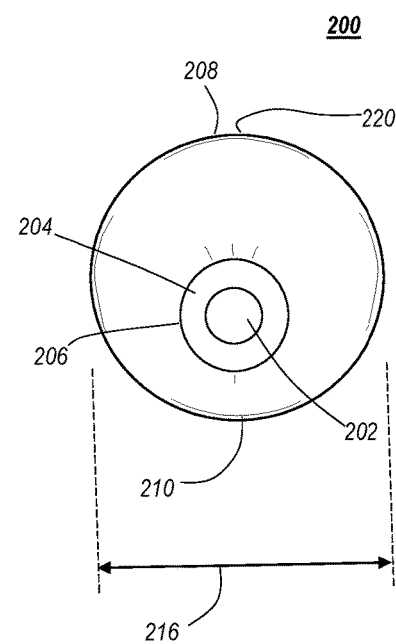

FIGS. 2A-2D show several views of a brake lever end cap 200, in accordance with some embodiments. FIG. 2A shows the brake lever end cap 200 from a top view as it would be installed on a bicycle brake lever. As shown there, the brake lever end cap 200 would fit on a left brake lever, and a right side version would simply be a mirror image of what is shown there FIG. 2B is an end view in the direction of arrow 212 in FIG. 2A, with the front of the brake lever end cap 200 at the top. FIG. 2C shows the brake lever end cap 200 from the front in the direction of arrow 214 of FIG. 2A, and FIG. 2D is an end view in the opposite direction of that of FIG. 2B.

The brake lever end cap 200 fits onto the end of a brake lever, and can cover some, most, or all of the brake lever. Specifically, an elongated leg portion comprised of straight section 206 and tapered section 204 fit over the brake lever. An opening 202 at the free end of the tapered section 204 allows insertion of the brake lever into the leg portion. The leg portion 204, 206 can be made of a resilient material such as rubber that can be deflected but which tends to return to its original shape when force is removed. The leg portion includes a bore 207 along its length from opening 202 that is configured to receive a bicycle brake lever. Specifically the bore 207 is sized to allow common bicycle brake levers to fit snugly into the bore such that friction between the material of the leg portion in the bore against the bicycle brake lever retains the brake lever end cap 200 on the bicycle brake lever. The tapered portion 204 provides a transition in diameter of the leg portion from the straight section 206 to the brake lever at opening 202 so that there is not an uncomfortable abrupt change in size from the lever end cap 200 to the brake lever.

Opposite the tapered portion 204 on the straight portion 206 is a foot portion 208. The straight portion 206 is attached to the foot portion 208 closer to the back 210 of the foot portion, and the front 220 of the foot portion is substantially farther from the straight portion 206. In general, the foot portion 208 is rounded (e.g. circular, oval, elliptical) in a plane normal to the elongated direction of the straight portion 206, and has a body that extends in a plane generally at a right angle to the straight portion 206. The foot portion 208 presents a generally flat surface 209 on the outer side, opposite the straight portion 206. The outward-facing flat surface 209 of the foot portion 208 can have a width, or height, or diameter 216, 218 of about one to two inches, depending on how the foot portion 208 is configured. It can be more or less in some embodiments, as well. The foot portion 208 spreads impact force over a much greater area that the end of the common bicycle brake lever, which can prevent injury to person from being impacted by a falling bicycle, and it can prevent breakage of the brake lever from hitting pavement or other rigid surfaces. The displacement of the straight portion 206 from the center of the foot portion to the back 210 of the foot portion can further reduce impact force by allowing the majority of the foot portion to deflect upon impact. Further, by extending the foot portion forward the front 220 of the foot portion 208 can act to block twigs from impacting the user's hand in certain applications.

Figure 3:
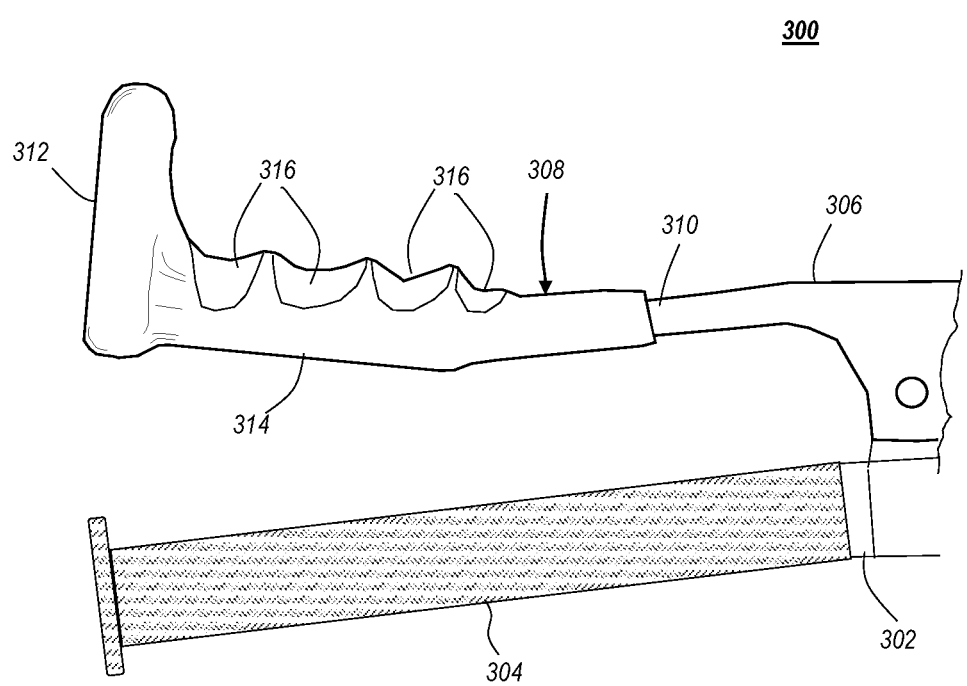
FIG. 3 shows a brake lever cap mounted on a brake lever, in accordance with some embodiments.

FIG. 3 shows top view 300 a brake lever end cap 308 mounted on a brake lever 310, in accordance with some embodiments. The brake lever 310 extends from a base 306 that is mounted on a handlebar 302, and a grip 304 can be present on the end of the handle bar 302, substantially as shown in FIG. 1. The brake lever end cap 308 can be configured substantially as shown in FIGS. 2A-2D, and includes a leg portion 314 and a foot portion 312 at a distal end of the leg portion 314. The leg portion 314 can be comprised of a straight section and a tapered section (e.g. 204, 206 of FIGS. 2A-2D) and has a bore or channel along a majority of its length to receive a substantial portion, if not substantially all of the brake lever 310 into the bore or channel. The leg portion 314 can include finger ridges 316 on the front of the leg portion (e.g. facing toward the front of the bicycle) to allow for better grip and consistent hand placement. As can be seen here, the relative positioning of the leg portion 314 to the foot portion 312 such that the leg portion 314 joins to the foot portion 312 near the back of the foot portion 312 allows the brake ever to be pulled back toward the handle bar 302 without unduly limiting the length of travel of the brake lever. That is, if the foot portion extend to the rear as much as it extend to the front, the back of the foot portion 312 could contact the handlebar 302 or grip 304 before the brake mechanism was sufficiently engaged.

Figure 4A:
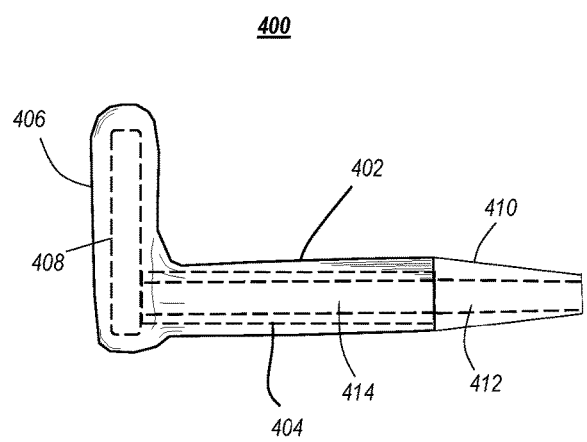
FIGS. 4A-4C show an internal rigid structure for a brake lever cap, in accordance with some embodiments.
Figure 4B:
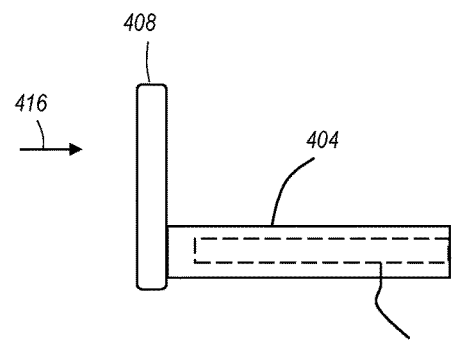
Figure 4C:
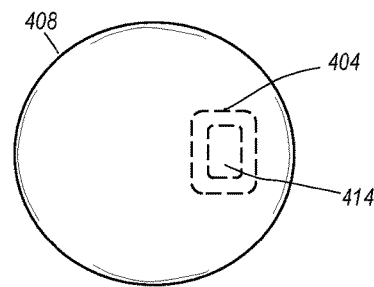

FIGS. 4A-4C show views of a bicycle brake lever end cap 400 that includes an internal rigid structure. FIG. 4A is a top or overhead view as if the brake lever end cap 400 were mounted on a left brake lever of a bicycle. FIG. 4B is a top view of the rigid structure, and FIG. 4C is an end side view of the rigid structure. It is thought that, for some application, such as larger, heavier bicycles, a stronger end cap may be desirable. The brake lever cap 400 here includes an internal rigid structure including a leg portion 404 and a foot portion 408. The leg portion 404 of the rigid structure is surrounded by a resilient material. The resilient material forms a straight portion 402 around the leg portion 404 of the rigid structure, and further forms a tapered portion 410 that does not surround any portion of the rigid structure. A foot portion 406 of the resilient material surrounds the foot portion 408 of the rigid structure. The tapered portion 410 includes a bore or channel 412 that is open at a distal end (the narrowest end). The channel 412 has a surface of the resilient material, which provides a good frictional interface to hold onto the material of the brake lever. The channel 412 is continued by a similar, but larger (crosswise) channel 414 in the leg portion 404 of the rigid structure. The channel 414 in the rigid structure is sized to allow the brake lever to pass through it with minimal frictional resistance since the rigid structure is not meant to deform and take on the shape of the brake lever like the tapered portion 410. In FIGS. 4B and 4C the foot 408 of the rigid structure cam be seen as having a disk or puck shape with a major surfaces oriented in a plane generally at a right angle to the elongated direction of the leg portion 404. As shown in FIG. 4C, the leg portion 404 and channel 414 in the leg portion 404 can have a square cross section, but a round cross section could be used, depending on the shape of the brake lever for which the end cap 400 is designed. Further, while the leg portion 404, and channel 414 are shown being substantially straight, they can have a slight curve to accommodate the curve of many brake levers. The rigid structure shown here can be made of a material such as plastic, metal, wood, or any other sufficiently rigid material that can prevent the end of the brake lever from passing through the end cap 400 upon impact.

Figure 5A:
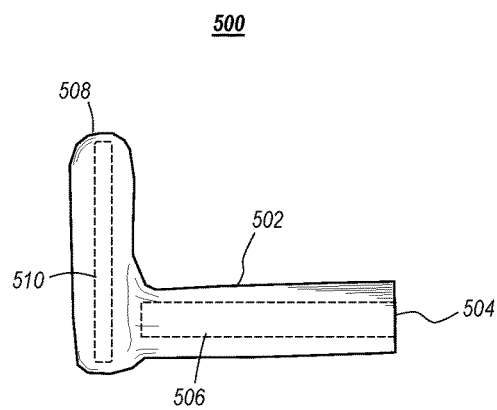
FIGS. 5A-5C show a brake lever cap having a lever cover portion with a rigid member in the end of the cap, in accordance with some embodiments.
Figure 5B:
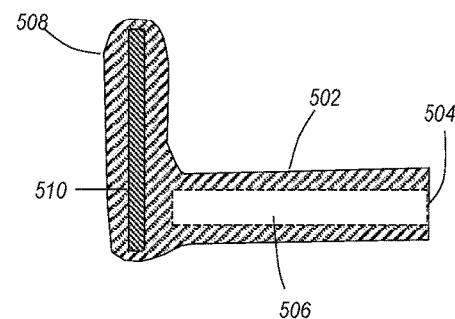
Figure 5C:
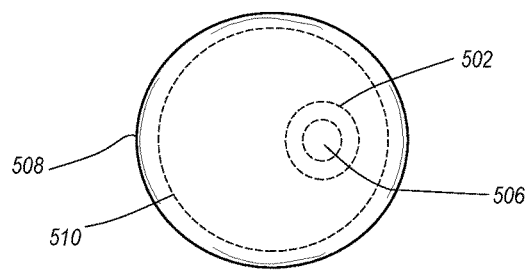

FIGS. 5A-5C show a brake lever end cap 500 that is made of a resilient material having a rigid member in the foot portion of the brake lever end cap 500. FIG. 5A is a top view of the end cap 500, FIG. 5B is a cross sectional top view taken centrally along the leg portion of the end cap 500, and FIG. 5C is an end view of the end cap 500 looking at the outward side of the foot portion. As with previously described end caps, the end cap 500 includes a leg portion 502 that is a generally elongated member having a bore or channel 506 along the length of the leg section 502 that open and an open end 504. The leg portion 502 meets a foot portion 508 such that a majority of the foot portion 508 extends forward of the leg portion 502. That is, the leg portion 502 meets the foot portion nearer a side or edge (heel) of the foot portion 508 rather than in the middle of the foot portion 508. The end cap is made of a resilient material, such as rubber, and includes a rigid member 510 disposed in the foot portion 508. The end cap 500 can be made by molding the resilient material around the rigid member 510 and another member that forms the channel 506. The rigid member generally follows the shape of the foot portion 508, and extends to completely cover the channel 506, as shown in FIG. 5C where the rigid member 510 completely overlaps the cross section of the channel 506 and extends substantially beyond, in a direction parallel to a plane defined by the rigid member (e.g. in FIG. 5B). The rigid member 510 prevents the end of a brake lever from passing through the foot portion 508 upon impact. The channel 506 is sized to provide a frictional interface against the exterior of the brake lever, without being so small that inserting the brake lever into the channel is too difficult. Whereas the embodiment of FIGS. 4A-4C includes rigid member having a leg portion, which can require the tapered portion 410 to frictionally retain the end cap 400 on a brake lever, the end cap 500 shown in FIGS. 5A-5C can have a shorter leg portion 502. The end of the leg portion 502 near the opening 504 can have a taper, however.

Figure 6A:
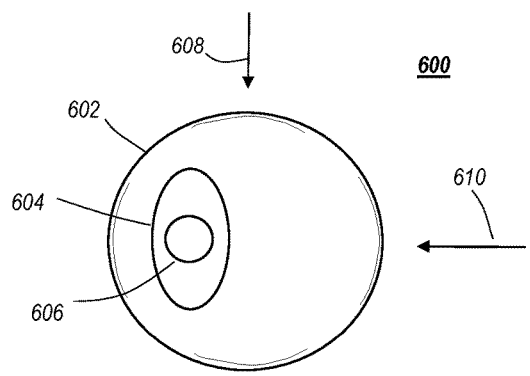
FIGS. 6A-6C show several views of a brake lever cap having a tapered lever cover portion, in accordance with some embodiments.
Figure 6B:
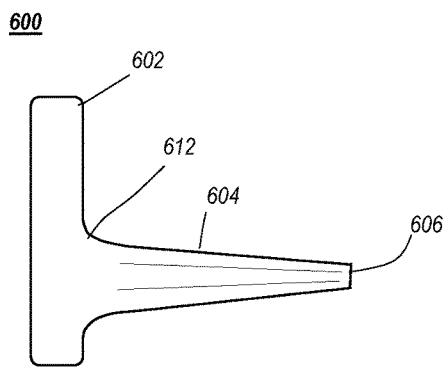
Figure 6C:
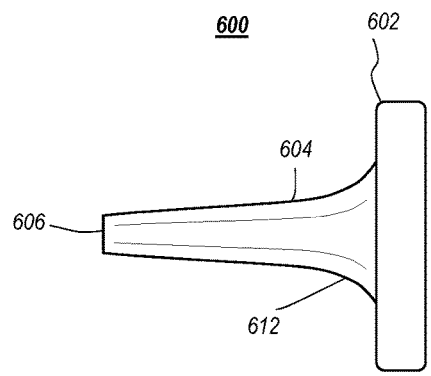

FIGS. 6A-6C show a brake lever end cap 600 similar to those previously described but which uses a leg portion 604 having taper that extends along the entire leg portion 604, and which has an oval cross section. FIG. 6A shows an end view of the end cap 600 looking into the leg portion 604, FIG. 6B is a top view looking in the direction of arrow 608, and FIG. 6C is a front view looking in the direction of arrow 610. In general, the leg portion 604 joins to a foot portion 602 in an offset manner such that a majority of the foot portion 602 extends forward of the leg portion 604. End cap 600 is intended for short brake levers, such as those found on children's' bicycles, and which are operated by children. The leg portion 604 has an oval cross section that is elongated in a vertical direction when the end cap is placed on the brake lever. Opening 606 is the end of channel through the leg portion 604 that is configured to receive a brake lever therein, and frictionally retain the end cap 600 on the brake lever. Where the leg portion 604 meets the foot portion 602, the taper of the leg portion increases relative to that of the majority of the leg portion 604 which encourages children to grip the brake lever away from the end of the brake level to avoid causing the end cap 600 to slip off the brake lever.

Figure 7A:
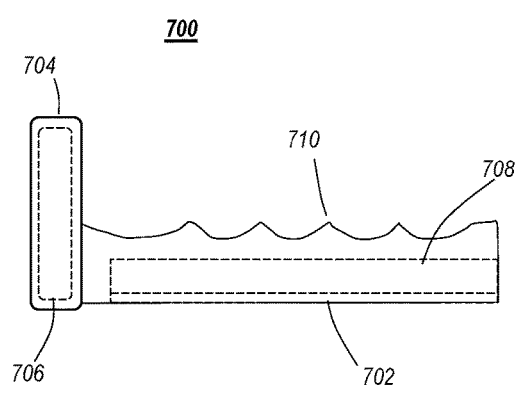
FIGS. 7A-7C show an alternative configuration for a combination handgrip and end cap for a brake lever, in accordance with some embodiments.
Figure 7B:
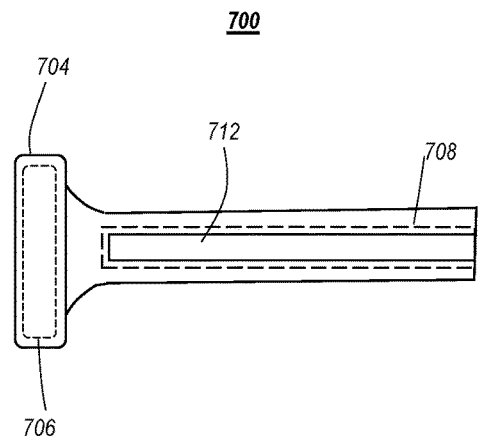
Figure 7C:
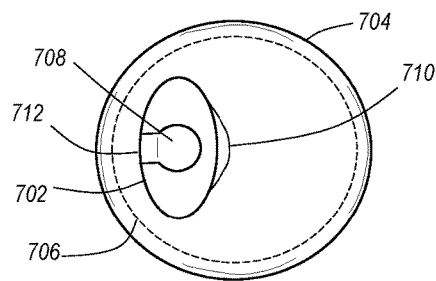

FIGS. 7A-7C show view of a brake lever end cap 700 in which the brake lever end cap 700 can be pressed onto the brake lever, rather than having to insert the brake lever into an opening, and push it onto the brake lever. FIG. 7A shows a top view of the end cap 700, FIG. 7B shows a rear view of the brake lever end cap 700, and FIG. 7C shows a right side end view of the brake lever end cap 700. The end cap 700 includes an elongated leg portion 702 that is attached to a foot portion 704 at one end of the leg portion 702. The leg portion 702 meets the foot portion 704 off center, near the rear of the foot portion 704 such that a majority of the foot portion 704 extends forward of the leg portion 702. The foot portion can contain a rigid member 706 that is made of metal, plastic, wood, or some other rigid material while the rest of the end cap 700 can be made of a resilient material such as rubber. Rubber provides both the resiliency to deform with a force that opposes the deformation and urges the material to return to its original shape. The leg portion 702 can have finger ridges 710 that form finger groves between the ridges 710. The leg portion 702 includes a channel 708 that runs generally centrally along the leg portion 702. The channel 708 has a width, and is open at the rear of the leg portion 702. The width of the channel opening 712 at the rear of the leg portion 702 is narrower than the width of the channel 708, and narrower than the brake lever. Further, the channel 708 is open at the end of the leg portion 702 opposite the foot portion 704. This arrangement allows the end cap 700 to be pressed onto the brake lever such that the brake lever passes through opening 712, deflecting the sides of the leg portion 702 apart until the brake lever is fully seated in the channel 708, and the sides of the leg portion 702 at the opening 712 move back to their original position, thereby capturing the brake lever in the channel 708.

A brake lever end cap for a bicycle brake lever has been disclosed that includes, generally, an elongated leg portion in which at least a portion of the brake lever is seated, and a foot portion joined to the leg portion and an end of the leg portion. The leg portion is joined to the foot portion such that the end of the leg portion joined to the foot portion is off center relative to the foot portion, and nearer the rear of the foot portion such that the majority of the foot portion extends forward of the leg portion. Thus, the end cap solved the problem of injury caused by being impacted by the unprotected brake lever by the end cap absorbing and spreading out the impact force over a much larger area than the end of the typical brake lever. Further, the foot portion also provides some protection for the hand while gripping the brake lever (and end cap) from twigs when riding through brush or similar cover.

What is claimed is:

1. A brake lever end cap for a bicycle brake lever, comprising:
   a rigid structure having:
      an elongated leg portion having a channel formed along a length of the elongated leg portion, the channel being open at a free end of the elongated leg portion and being configured to receive at least a distal end of the brake lever therein;
      a foot portion formed at end of the elongated leg portion that is opposite the free end, wherein the elongated leg portion is joined to the foot portion off-center such that a majority of the foot portion extends forward of the elongated leg portion; and an outer cover formed over the rigid structure, the outer cover being formed of a resilient material and having an opening at the free end of the elongated leg portion.

2. The brake lever end cap of claim 1, wherein the outer covering partially obstructs the opening of the bore or channel in the rigid structure to provide a frictional engagement with the brake lever.

3. The brake lever send cap of claim 1, wherein the outer covering extends from the free end of the rigid structure and is tapered from the free end of the rigid structure to reduce in cross sectional area.

4. The brake lever end cap of claim 1, wherein the foot portion is circular.

5. The brake lever end cap of claim 1, wherein the outer covering includes finger ridges.

6. The brake lever end cap of claim 1, wherein the channel has a channel opening at a back of the leg portion along the leg portion, the channel has a width, the outer covering forms an opening along the channel opening that is narrower than the channel.

7. An end cap for a bicycle brake lever, comprising:
an elongated leg portion having a free end and a channel that runs from the free end along the elongated leg portion inside the elongated leg portion, wherein the channel is configured to receive a bicycle brake lever therein;
a foot portion joined to the elongated leg portion at an end of the elongated leg portion that is opposite the free end of the elongated leg portion, wherein the foot portion is at a generally right angle to an elongated direction of the elongated leg portion, and the elongated leg portion is joined to the foot portion off center relative to the foot portion such that a majority of the foot portion extends forward of the elongated leg portion; and
a rigid structure disposed in the foot portion;
wherein the foot portion and the elongated leg portion are made of a resilient material.

8. The end cap of claim 7, further comprising a rigid structure disposed in the channel of the elongated leg portion and that is joined to the rigid structure in the foot portion, wherein the rigid structure in the elongated leg portion incudes an elongated channel along the channel of the elongated leg portion.

9. The end cap of claim 8, wherein the elongated leg portion further includes a tapered section at the free end, wherein the rigid structure in the elongated leg portion does not extend into the tapered portion, and wherein the channel through the tapered portion is narrower than the channel though the rigid member in the elongated leg portion.

10. The end cap of claim 7, wherein the elongated leg portion includes finger ridges.

11. The end cap of claim 7, wherein the entire elongated leg portion is tapered, increasing in width from the free end to the foot portion.

12. The end cap of claim 7, wherein the channel in the elongated leg portion has a channel opening at a back of the leg portion along the leg portion, the channel has a width, the outer covering forms an opening along the channel opening that is narrower than the channel.

13. The end cap of claim 7, wherein the foot portion is circular in a plane normal to the elongated direction of the elongated leg portion.

14. The end cap of claim 7, wherein the elongated leg portion has a non-circular cross section in a direction normal to the elongated direction of the elongated leg portion.

15. The end cap of claim 14, wherein the non-circular cross section is oval-shaped.

16. The end cap of claim 14, wherein the non-circular cross section is rectangular.

\* \* \* \* \*